United States Patent Office 3,105,002
Patented Sept. 24, 1963

---

3,105,002
O,O-DIETHYL S-[2-(1-METHYL)UREIDO-2-OXOETH-YL] PHOSPHORODITHIOATE AND USE AS A PESTICIDE
Albert H. Haubein, Newark, Del., assignor to Hercules Powder Company, Wilmington, Del., a corporation of Delaware
No Drawing. Filed May 23, 1962, Ser. No. 196,864
4 Claims. (Cl. 167—22)

This invention relates to plant systemic insecticides and more particularly to O,O-diethyl S-[2-(1-methyl)ureido-2-oxoethyl] phosphorodithioate and its use as a plant systemic insecticide.

Plant systemic insecticides are substances which are transportable through the plant system, thereby rendering the juices of the plant toxic to insects. Substances which are satisfactory for this use must be readily absorbed by the plant, be resistant to detoxification by the plant and not be toxic to the plant itself so as to cause wilt, defoliation or death of the plant.

Now in accordance with the present invention it has been found that O,O-diethyl S-[2-(1-methyl)ureido-2-oxoethyl] phosphorodithioate is a particularly outstanding plant systemic insecticide.

O,O-diethyl S-[2-(1-methyl)ureido-2-oxoethyl] phosphorodithioate, hereinafter referred to as compound I, is prepared by reacting 1-chloroacetyl-1-methylurea

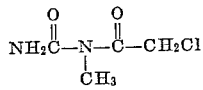

with

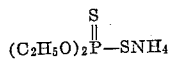

at slightly elevated temperature and the 1-chloroacetyl-1-methylurea is prepared by reacting chloroacetic acid with methylcyanamide. The structure of 1-chloroacetyl-1-methylurea is verified by proof of the presence of the

group as indicated by liberation of nitrogen when treated with nitrous acid, and also as indicated by the doublet absorption band at 3 and 3.1μ in the infrared.

The method of preparation and use of compound I as a plant systemic insecticide is illustrated by the following example wherein all parts and percentages are by weight.

Example 1

To 9.3 parts of 1-chloroacetyl-1-methylurea dissolved in 80 parts acetone was added 14 parts ammonium diethyl phosphorodithioate and the resulting solution was heated at 50–60° C. for 4 hours. During this reaction, ammonium chloride separated and it was removed by filtration. The filtered solution was diluted with water to obtain crystalline compound I, M.P. 93–95° C. amounting to 15 parts. It analyzed 10.1% P and 8.7% N (calculated values=10.3% P and 9.3% N).

Compound I is readily absorbed by cut stems of bean plants without detoxification, but it is particularly outstanding in being absorbed by the root system of leafy plants without detoxification.

Compound I was made into aqueous dispersions of various concentrations by dissolving one part of compound I and one part of Tween 20 (sorbitol monolaurate polyoxyethylene adduct) in one part of toluene to form a concentrate and dispersing this concentrate in sufficient water to make 100 parts of aqueous dispersion. This dispersion was then diluted in aliquots to form dispersions of lower concentration of 0.025% and 0.01%. These diluted dispersions were then used in systemic tests.

A systemic test known as the potted plant test was carried out on individual 1–2 week old bean and pea plants growing in pots containing 150 g. of soil. To the soil of a growing plant was added 15 g. aqueous dispersion of various concentrations and, at one day intervals, the bean plants were infested with 2-spotted mites, and the pea plants were infested with pea aphids. Each plant was protected by a cover to avoid loss of insects, and the mortality of the insects was determined on the third day after infestation. The length of time during which the plants remained toxic was an indication of the potency for a given concentration of compound I.

In this test a 0.025% solution gave a 100% kill of pea aphids for over 6 days and a 100% kill of 2-spotted mites for over 7 days.

In order to render plants toxic to sucking insects by contact of the roots of the growing plants with the compound, this compound I may be introduced into the soil before or after the growing plant draws on this soil for nourishment. It may thus be introduced into the soil along with the seeds from which the plant grows, and to this end it is convenient to coat the seeds with the compound I. This is conveniently accomplished by coating the seeds with a diluted composition of compound I and a carrier. The carrier may be liquid or solid such as water or a wettable powder. A suitable liquid composition is an aqueous dispersion of compound I containing a dispersing agent. A suitable solid composition is activated carbon impregnated with compound I.

When the compound I is introduced into the soil after the plant has begun to grow, the compound is most conveniently introduced as an aqueous dispersion.

For the preparation of aqueous dispersions used in practical applications, a concentrate of the toxic compound, dissolved in sufficient organic solvent to effect dissolution, and a dispersing agent is first made, and this concentrate is diluted with water in sufficient amount to permit ease of distribution to the plants being treated.

The solvent used in making the concentrate may be any one or a mixture of the following: benzene, toluene, xylenes, acetone, methyl ethyl ketone, butyl acetate, turpentine, or naphtha. The aromatic hydrocarbons are preferred. The amount of solvent used is at least sufficient to dissolve compound I but not more than about 50% of the concentrate.

The dispersing agent used in the concentrate may be selected from any of the anionic, cationic and nonionic dispersing agents which are well known for this use in the insecticide art. The nonionic dispersing agents are preferred. Examples of suitable dispersing and wetting agents are: polyoxyethylene derivatives of fatty acids (Atlox 3387), polyoxyethylene derivatives of sorbitol monolaurate (Tween 20), isooctylphenyl polyethoxyethanol (Triton X–100), sodium N-methyl-N-oleoyl taurate (Igepon T77), sodium lignin sulfonate (Polyfon H), sorbitan trioleate (Span 85), sodium alkylnaphthalene sulfonate (Naccosol A), dioctyl ester of sodium sulfosuccinic acid (Aerosol OT-B), fatty acid soaps, and resin acid soaps.

The concentrate will usually contain from about 10 to 50% of compound I.

The aqueous dispersion made by dispersing the concentrate in water will be of sufficient dilution that the proper distribution of the compound I to the plants can be made and this will depend on the means of distribution. The dispersion may be applied directly to the soil around the plants or it may be sprayed on the plants, where it is partially effective, but where rain or subsequent watering is relied on to wash the compound into the soil. The amount of compound I per square foot of soil will vary with the closeness of spacing of the plants, the size of the plants treated, and the length of time for which effectiveness is desired. For small plants, the amount of compound used will be as low as 0.001 gram per plant for effectiveness over a 1-2 day period. A large excess is not harmful and as much as 0.1 gram per plant may be used for longer effectiveness. The amount of water used in the distribution of the compound in the dispersion used as well as in the additional water should be the amount normally required by a growing plant. Excessive dilution will reduce the amount of compound I taken up by the plant and will spread the effectiveness over a longer period of time provided the toxicant is not washed out of the soil. The various factors generally considered by horticulturists will be obvious to one wishing to get greatest effectiveness out of the compound of this invention. The concentration after dilution is about 2 to 0.001%.

Compositions of the toxicant on solid carriers which may be dusts or granules are readily prepared by mixing a concentrate of the toxicant in an organic solvent or in a concentrated aqueous emulsion on the solid carrier and the solid composition may be diluted further as desired. The concentrations used may be similar to the concentrations used with aqueous dispersions.

The systemic activity of the compound of this invention applies to all leafy plants, and the systemic toxicant effectively controls all sucking insects which draw their nourishment from the leafy parts of the plants and stems.

What I claim and desire to protect by Letters Patent is:

1. As a new composition of matter O,O-diethyl S-[2-(1-methyl)ureido-2-oxoethyl] phosphorodithioate.

2. A plant systemic insecticide concentrate comprising the compound of claim 1 admixed with a carrier therefor.

3. The method of rendering plants toxic to insects which comprises contacting the plant with the compound of claim 1.

4. The method of rendering plants toxic to insects which comprises contacting the roots of the plant with an aqueous dispersion of the compound of claim 1.

References Cited in the file of this patent
UNITED STATES PATENTS

| | | |
|---|---|---|
| 2,826,529 | Shapiro | Mar. 11, 1958 |
| 2,841,517 | Boon et al. | July 1, 1958 |
| 2,864,849 | Schrader | Dec. 16, 1958 |
| 2,890,947 | Annable et al. | June 16, 1959 |
| 2,912,452 | Schrader et al. | Nov. 10, 1959 |
| 3,038,001 | Wadsworth et al. | June 5, 1962 |
| 3,041,366 | Senkbeil | June 26, 1962 |